United States Patent
Pei et al.

(10) Patent No.: US 9,462,245 B2
(45) Date of Patent: Oct. 4, 2016

(54) IMAGE CORRECTION METHOD AND IMAGE PROJECTION APPARATUS USING THE SAME

(71) Applicants: LITE-ON ELECTRONICS (GUANGZHOU) LIMITED, Guangzhou OT (CN); Lite-On Technology Corporation, Taipei OT (TW)

(72) Inventors: Shi-Jia Pei, Hsinchu (TW); Wen-Lung Lin, Hsinchu (TW); De-Jian Ou, Hsinchu (TW); Fu-Ji Tsai, Hsinchu (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 248 days.

(21) Appl. No.: 14/231,754

(22) Filed: Apr. 1, 2014

(65) Prior Publication Data

US 2015/0208048 A1    Jul. 23, 2015

(30) Foreign Application Priority Data

Jan. 21, 2014  (CN) .......................... 2014 1 0026836

(51) Int. Cl.
*H04N 9/31* (2006.01)
*G02B 26/08* (2006.01)

(52) U.S. Cl.
CPC ........ *H04N 9/3185* (2013.01); *G02B 26/0833* (2013.01); *H04N 9/3129* (2013.01)

(58) Field of Classification Search
CPC ... G02B 26/08; H04N 9/3129; H04N 9/3185
See application file for complete search history.

(56) References Cited

U.S. PATENT DOCUMENTS 6,670,603 B2* 12/2003 Shimada ................ G03B 21/00
250/235

* cited by examiner

*Primary Examiner* — Sultan Chowdhury
*Assistant Examiner* — Danell L Owens
(74) *Attorney, Agent, or Firm* — Jianq Chyun IP Office

(57) ABSTRACT

A method for image correction and image projection apparatus using the same are provided, where the image projection apparatus scans a projection light beam on a projection plane to form an image. The image correction method includes the following steps. A plurality of projection points of the projection light beam on the projection plane are sampled to define a projection coordinate system. An image projection area is defined on the projection coordinate system. The projection light beam is moved to scan on the projection plane and projected to the projection points sequentially. Whether the projection point is located in the image projection area is determined. When the projection point is located in the image projection area, a corrected image information is provided to the projection point.

8 Claims, 3 Drawing Sheets

IMAGE CORRECTION METHOD AND IMAGE PROJECTION APPARATUS USING THE SAME

CROSS-REFERENCE TO RELATED APPLICATION

This application claims the priority benefit of China application serial no. 201410026836.9, filed on Jan. 21, 2014. The entirety of the above-mentioned patent application is hereby incorporated by reference herein and made a part of this specification.

BACKGROUND OF THE INVENTION

1. Technical Field

The invention relates to a method for image correction and an image projection apparatus using the same. More particularly, the invention relates to a method for correcting the geometric distortion of an image and an image projection apparatus using the same.

2. Related Art

Microelectromechanical systems (MEMS) refer to a research area utilizing microelectronic and micromechanical techniques to manufacture or develop related electronic devices and mechanical structures to microminiaturize related products. Due to its technical effects such as small size and low power consumption, an image projection apparatus employing a MEMS scanning device may be applied in handheld electronic products (e.g. smartphones or notebook computers) to enhance the usage convenience of the image projection apparatus, and to replace the traditional desk type or fixed image projection apparatuses.

Typically speaking, the image projection apparatus utilizing the MEMS scanning device employs a projection light source to provide a projection light beam. Moreover, the projection light beam is projected on a projection plane by using optical elements such as the MEMS scanning device and reflection mirrors. An image is formed by oscillating the scanning mirror inside the MEMS scanning device on the fast and slow axes to move the projection light beam to scan on the projection plane, as well as by the human visual retention characteristics. When operating the MEMS scanning device, typically different respective control signals are used to control oscillation frequency and angle of the scanning mirror on the corresponding axial direction (e.g. fast and slow axes), so as to control the scanning speed and direction of the projection light beam on the projection plane. However, in the process of moving the projection light beam to scan and project to the projection plane, due to the planarity of the reflection plane of the scanning mirror and/or the optical path problems such as refraction and reflection caused by the optical elements, the projection path of the projection light beam may change. Accordingly, the projection image may be geometrically distorted, thereby affecting the image display quality. Moreover, since the oscillation of the MEMS scanning device on the fast axis is typically controlled by a periodic sine wave, therefore, when the MEMS scanning device moves the projection light beam to project near a projection boundary and is about to reverse scan direction, the oscillation speed of the MEMS scanning device comparatively decreases and generates issues such as uneven scanning speed for the projection light beam.

Conventional techniques typically correct for the geometric distortion of the projection image with lens configurations. However, configuring lenses may lower the light efficiency of the projection light beam and correspondingly increase the manufacturing costs of the image projection apparatus. Therefore, researchers are looking for direct and simple methods to correct the geometric distortion of projection images.

SUMMARY

The invention provides a method for image correction and an image projection apparatus using the same, capable of preventing geometric distortion of the projection image by providing corrected image information in a selected image projection area.

An embodiment of the invention provides a method for image correction on an image projection apparatus, in which the image apparatus scans a projection light beam on a projection plane to form an image. The method for image correction includes: sampling a plurality of projection points of the projection light beam on the projection plane to define a projection coordinate system; defining an image projection area on the projection coordinate system; moving the projection light beam to scan on the projection plane and project to the projection points sequentially; determining whether each of the projection points is located in the image projection area; and when the projection point is located in the image projection area, providing a corrected image information to the projection point.

An embodiment of the invention provides an image projection apparatus, including a scanning device and a control unit. The scanning device moves a projection light beam to scan on a projection plane to form an image. The control unit samples a plurality of projection points of the projection light beam on the projection plane to define a projection coordinate system; defines an image projection area on the projection coordinate system; moves the projection light beam to scan on the projection plane and project to the projection points sequentially; determines whether each of the projection points is located in the image projection area; and when the projection point is located in the image projection area, provides a corrected image information to the projection point.

In summary, the image projection apparatus and image correction method provided in embodiments of the invention may define the image projection area and determine whether the projection point is located within the image projection area or outside the image projection area. When the projection light beam is projected to the projection points in the image projection area, by providing the corrected image information to the projection points through the projection light beam, the image is only displayed in the image projection area, thereby correcting the geometric distortion of the projection image. In other words, the image projection apparatus and image correction method provided in embodiments of the invention do not require setting up extra equipments to correct the geometric distortion of the projection image. Accordingly, interference on the projection light beam is reduced and the manufacturing cost of the image projection apparatus is lowered.

To make the above features and advantages of the invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1:
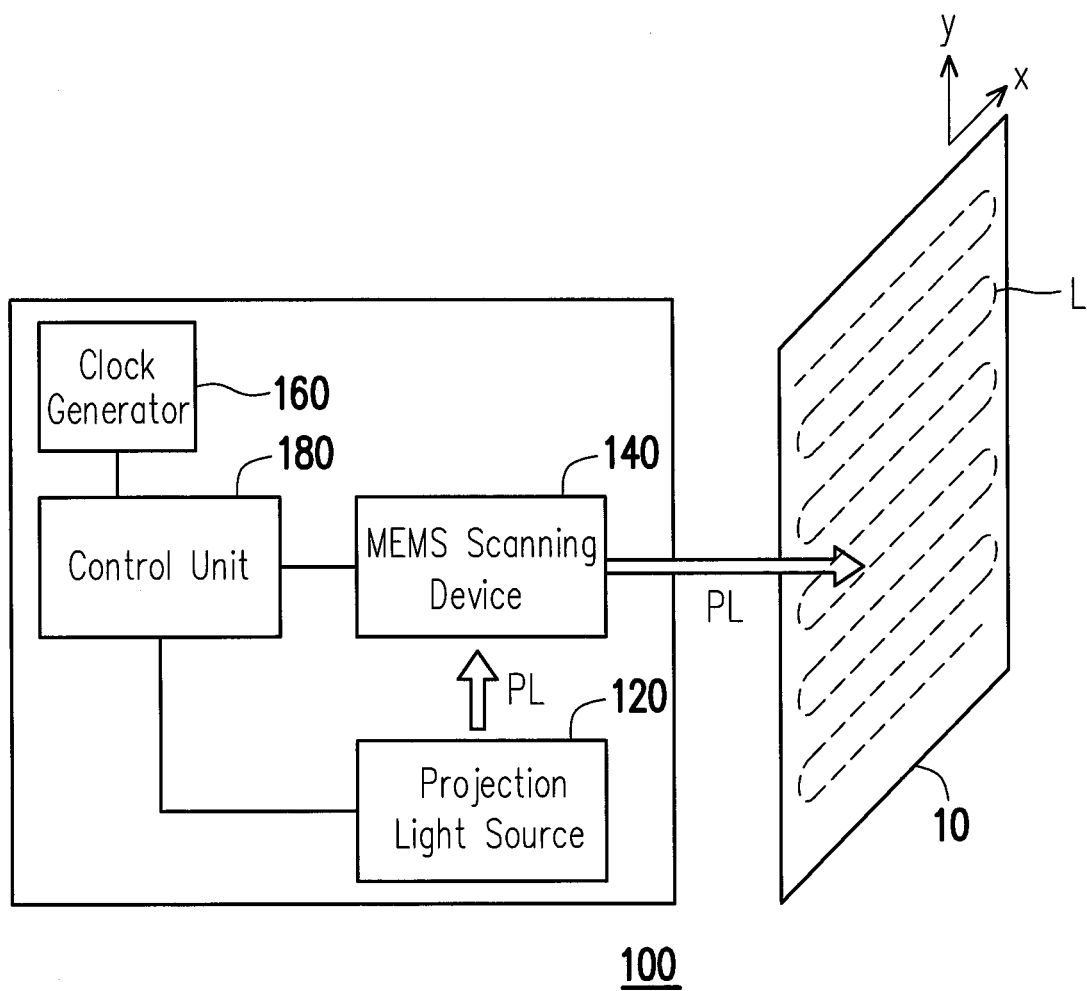
FIG. 1 is a schematic block diagram of an image projection apparatus according to an embodiment of the invention.

Descriptions of the invention are given with reference to the exemplary embodiments illustrated with accompanied drawings. Moreover, when possible, elements/components/notations with same reference numerals represent same or similar parts in the drawings and embodiments.

Typically speaking, an image is formed by an image projection apparatus with optical elements such as reflection mirrors and lenses by projecting a projection light beam on a projection plane, and the MEMS scanning device moving the projection light beam to scan back and forth on the projection plane. However, in the afore-described image projection method, the projection light beam may deviate from an expected scan trajectory and projection range due to the planarity of the reflection plane of the scanning mirror and/or optical path factors such as reflection and refraction caused by the optical elements, thereby causing geometric distortion of the projection image. The methods for image correction provided in embodiments of the invention are used on an image projection apparatus to correct the geometric distortion on an image, and the image correction methods are capable of geometric distortion correction of the projection image without the need to set up additional equipment.

FIG. 1 is a schematic block diagram of an image projection apparatus according to an embodiment of the invention. An image projection apparatus 100 includes a projection light source 120, a MEMS scanning device 140, a clock generator 160, and a control unit 180. In the present embodiment, the projection light source 120 is a laser light source providing a projection light beam PL. In specifics, the projection light source 120 may be a red, green, and blue (RGB) laser light source capable of achieving full color projection by respectively adjusting each color of light as well as color mixing. The MEMS scanning device 140 oscillates to move the projection light beam PL to scan back and forth along a scanning path L on a projection plane 10 to form an image. The clock generator 160 provides a clock signal to the control unit 180. According to an image information and the scanning path L, the control unit 180 controls the projection light source 120 to generate the corresponding projection light beam PL. In other embodiments, the control unit 180 may also control an oscillation frequency or angle of the MEMS scanning device 140 on a specific direction.

Figure 2:
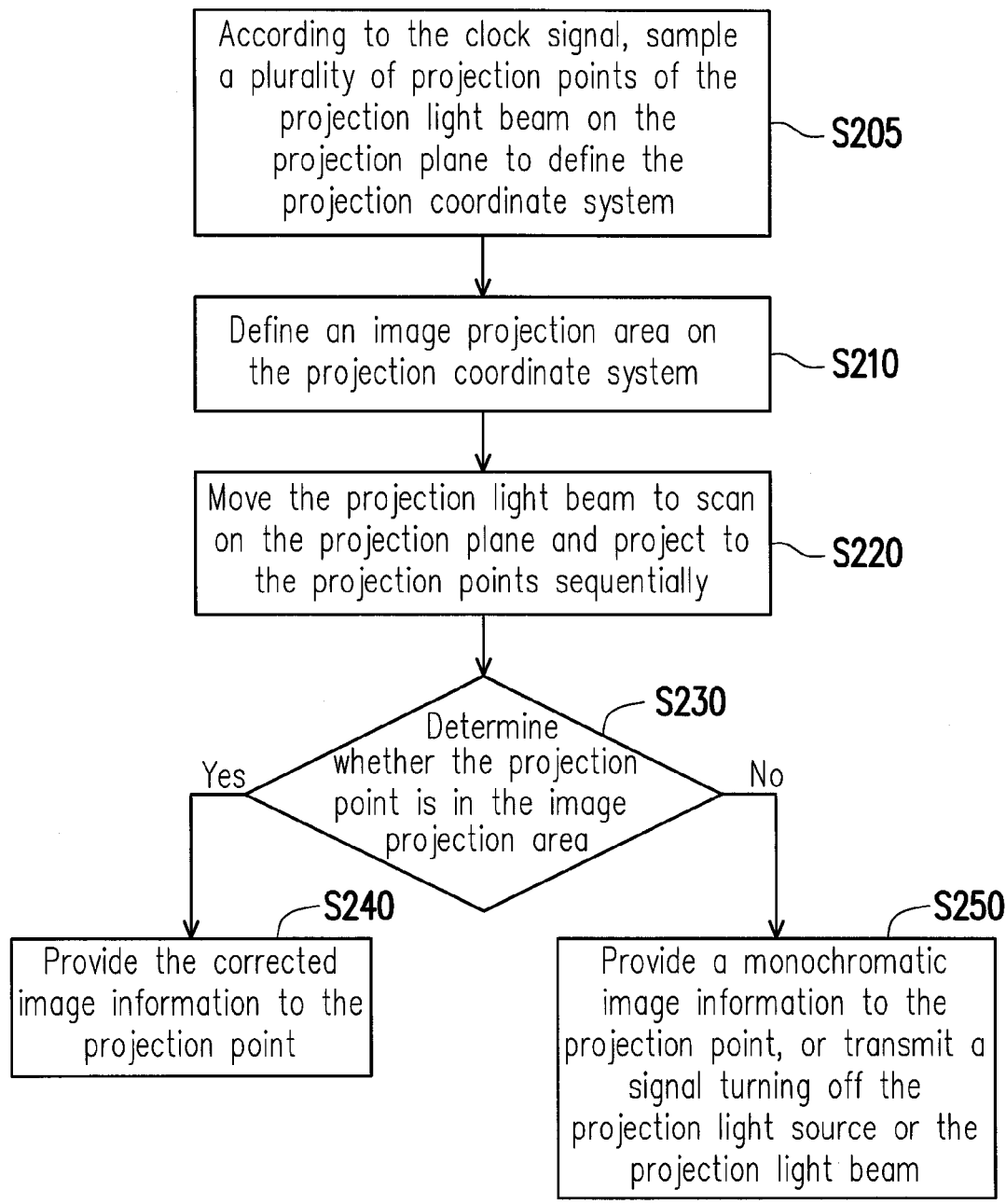
FIG. 2 is a flowchart of a method for image correction according to an embodiment of the invention.

FIG. 2 is a flowchart of a method for image correction according to an embodiment of the invention. With reference to FIGS. 1 and 2, the image correction method includes the following steps. In Step S205, according to the clock signal, the control unit 180 samples a plurality of projection points of the projection light beam PL on the projection plane 10 to define a projection coordinate system. In Step S210, the control unit 180 defines an image projection area on the projection coordinate system. In Step S220, the MEMS scanning device 140 of the image projection apparatus 100 moves the projection light beam PL to scan on the projection plane 10 and project to the projection points sequentially. In Step S230, the control unit 180 determines whether each of the projection points is located in the image projection area. When the projection point is determined to be located in the image projection area, the image correction method proceeds to Step S240. According to a corrected image information, the control unit 180 controls the projection light source 120, so that the projection light beam PL provides a corresponding corrected image information to the projection point and the image information is displayed on the image projection area. In the present embodiment, the image correction method may further include the following step. When the projection point is determined to be located outside the image projection area, the image correction method proceeds to Step S250. The control unit 180 controls the projection light source 120, so that the projection light beam PL provides a monochromatic image information to the projection point, or the control unit 180 transmits a signal turning off the projection light source 120 or the projection light beam PL, so that the projection light beam PL cannot be projected to the projection point located outside the image projection area.

Figure 3:
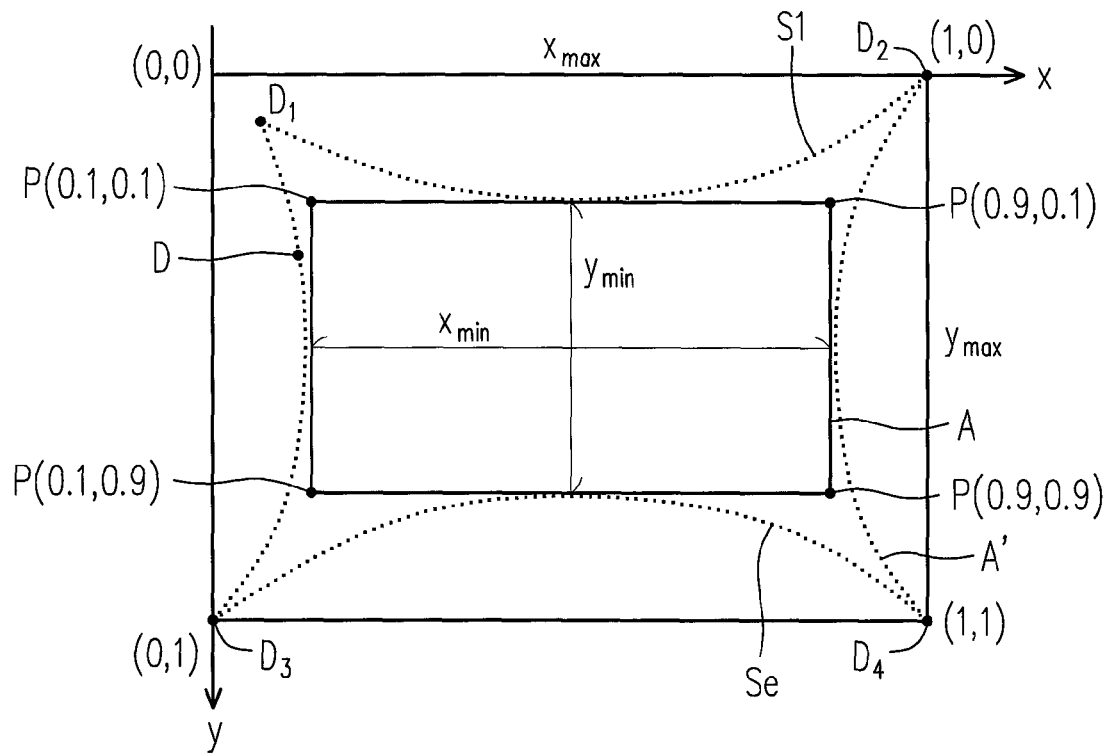
FIG. 3 is a schematic view of a projection coordinate system and an image projection area according to an embodiment of the invention.

FIG. 3 is a schematic view of a projection coordinate system and an image projection area according to an embodiment of the invention. With reference to FIGS. 1, 2, and 3, as described earlier, since the projection light beam PL is affected by optical path factors such as reflection and refraction, geometric distortion is generated by the projection light beam PL on a scanning area A' (shown by the dotted line) on the projection plane 10. In FIG. 3, only the projection points D1-D4 of the four corners of the scanning area A' are labeled. However, a plurality of projection points D are included in the scanning area A'. Since the projection beam PL respectively scans along the x and y directions on the projection plane 10, the scanning path L (shown in FIG. 1) includes a plurality of scan lines on the x direction. Assuming the pixel setting of a projection image is M×N, in which M and N are positive integers, when the projection image is projected to the scanning area A', each of the scan lines includes M projection points, and each of the scan frames includes N scan lines. For example, assuming the pixel setting of the projection image is 1280×720, then each of the scan lines includes 1280 projection points, and each of the scan frames includes 720 scan lines.

As shown in FIG. 3, the projection points D1 and D2 are the first and last projection points of a first scan line S1, and the projection points D3 and D4 are the first and last projection points of a last scan line Se. Under ideal conditions, each of the scan lines should be a straight line. However, the actual scan line is deformed due to external factors, and the scan line appears to be a curved line, as shown by scan lines S1 and Se.

In the image correction method of the present embodiment, the control unit 180 in Step S205 samples a plurality of projection points D of the projection light beam PL on the projection plane 10 according to the clock signal, in order to define the projection coordinate system. For example, after the control unit 180 samples the projection points D of the projection light beam PL substantially on the projection plane 10, the control unit 180 further calculates the maximum distances $x_{max}$ and $y_{max}$ between the projection points D along a first axis (e.g. x-axis) and a second axis (e.g. y-axis). Moreover, the projection coordinate system is defined according to the maximum distance $x_{max}$ along the first axis (x-axis) and the maximum distance $y_{max}$ along the second axis (x-axis). With reference to FIG. 3, in the embodiment depicted in FIG. 3, a distance between a projection point $D_3$ and a projection point $D_2$ among all the projection points D has the maximum distance $x_{max}$ on the first axis (x-axis), and a distance between a projection point $D_2$ and a projection point $D_4$ among all the projection points D has the maximum distance $y_{max}$ on the second axis (y-axis). According to the maximum distances $x_{max}$ and $y_{max}$ between the projection points D, the control unit 180 positions four end points of the projection coordinate system (respectively coordinate points (0,0), (1,0), (0,1), and (1,1)), and thereby defining the projection coordinate system.

In a method for defining the projection coordinate system, an image capturing device may be used to capture the projection point locations on the projection plane 10 and obtain a line curve of each of the scan lines, thereby further obtaining the projection point coordinates of the projection points D in the projection coordinate system. Assuming the pixel setting of the projection image is M×N, and using the scan line S1 in FIG. 3 as an example, when the projection light beam PL scans along the scan line S1, the control unit 180 controls the projection light beam PL to generate M projection points D along the scan line S1 according to the clock signal. When the projection beam PL scans along the scanning path L on the projection plane 10, the projection point locations on the projection plane 10 may be captured by the image capturing device, and thereby obtain the line curve of each of the scan lines. A parameter of the line curve for each of the scan lines may be time, for example. Moreover, by using a polynomial approximation method, a corresponding geometric distortion equation f(t) may be obtained to represent the location of each of the projection points D on the scan line, in which parameter t represents a sequence of the projection points D in accordance with the timing frequency. The geometric distortion equation f(t) corresponding to different scan lines may be collected as a geometric distortion equation set $F=\{f_1(t), f_2(t) \ldots f_k(t)\}$, in which k is a positive integer. Each of the geometric distortion equations f(t) respectively includes a x-coordinate polynomial hx(t) and a y-coordinate polynomial hy(t); that is, f(t)=(hx(t), hy(t)). Assuming a third order polynomial is used to approximate the curves, then hx(t) and hy(t) may respectively represent $hx(t)=C_{3x}*t^3+C_{2x}*t^2+C_{1x}*t\pm C_{0x}$, and $hy(t)=C_{3y}*t^3+C_{2y}*t^2+C_{1y}*t+C_{0y}$, in which C is a polynomial parameter.

When the projection location of a certain projection point D is needed, the projection sequence t of the certain projection point D according to the timing frequency may be determined, and then the corresponding geometric distortion equation f(t) is selected from the geometric distortion equation set F. Thereafter, the projection sequence t is substituted into the geometric distortion equation f(t), and then the projection location of the projection point D can be calculated. In the present embodiment, the projection sequence t of each of the projection points D may be obtained by calculating a number of cycles (e.g. a cycle being equaled to T) of the clock frequency. In the present embodiment, a cycle T of the clock frequency corresponds to a pixel. That is, one cycle T of the clock frequency corresponds to one projection point D, although the invention is not limited thereto. A cycle T of the clock frequency may also correspond to other quantities of pixels and projection points D.

In the present embodiment, each of the geometric distortion equations f(t) corresponds to a scan line. In other embodiments, each of the scanning areas may be divided into a plurality of regions, and each of the geometric distortion equations f(t) corresponds to a region. In other embodiments, all or a portion of the scan lines may be selected, and curve approximation is performed on the selected portion of the scan lines, so as to obtain the respective corresponding geometric distortion equation f(t) and to collect these equations into the geometric distortion equation set F.

In the present embodiment, the geometric distortion equation set F is normalized to define the projection locations of the projection points D in the scanning area A' in the projection coordinate system and obtain the projection point coordinates. Specifically, after the projection coordinate system is defined in Step S205 according to the maximum distances $x_{max}$ and $y_{max}$ between the projection points D along the first axis (e.g. x-axis) and the second axis (e.g. y-axis), thereafter the captured line curves of each of the scan lines are used to obtain the corresponding polynomial equations by polynomial approximation. Furthermore, the polynomial equations are normalized to obtain the corresponding geometric distortion equations, and these equations are collected into the geometric distortion equation set F. By substituting the time parameter (e.g. projection sequence t) of the projection points D into the corresponding geometric distortion equations of the geometric distortion equation set F, the projection point locations of the projection points D in the projection coordinate system can be obtained.

With reference again to FIGS. 1, 2, and 3, in Step S210, the control unit 180 defines an image projection area A on the projection coordinate system. In the present embodiment, a range of the image projection area A is within a range of the scanning area A'. In one embodiment, the image projection area A may be defined by the minimum distances $x_{min}$ and $y_{min}$ between the projection points D along the first axis (e.g. x-axis) and the second axis (e.g. y-axis). When defining the image projection area A, the control unit 180 determines a coordinate range of the image projection area A on the projection coordinate system. Moreover, according to the resolution of the image and the projection coordinate system, the control unit 180 determines the coordinates of each of the pixels (pixels P) of the image displayed in the image projection area A, so as to provide a plurality of pixel coordinates.

In the projection coordinate system, assume a range of the image projection area A along the first axis (x-axis) is X1 to X2, a range along the second axis (y-axis) is Y1 to Y2, and the projection image is projected in the image projection area A to avoid the regions around the scanning area A' with scan line distortion. Moreover, assuming the resolution of the projection image is set to be M×N, in which M and N are positive integers, then the pixel coordinates of each of the pixels may be calculated by the following equations:

$x_p = X1 + n_x * \Delta p_x$ (equation 1)

$y_p = Y1 + n_y * \Delta p_y$ (equation 2)

where the range of $n_x$ is 0 to (M−1), the range of $n_y$ is 0 to (N−1), $\Delta p_x$ is (X2−X1)/(M−1), and $\Delta p_y$ is (Y2−Y1)/(N−1). The pixel coordinates may be changed according to the resolution of the projection image and the range setting of the image projection area A, and the pixel coordinates may be obtained through recalculation by the control unit 180 of the image projection apparatus 100. Using the embodiment depicted in FIG. 3 as an example, assume that the range of the image projection area A along the first axis (x-axis) is 0.1 to 0.9, the range of the image projection area A along the second axis (y-axis) is 0.1 to 0.9, and the resolution of the image in the image projection area A is set to be 1280×720, then the range of $n_x$ is 0 to 1279, the range of $n_y$ is 0 to 719, $\Delta p_x$ is (0.9−0.1)/1279, and $\Delta p_y$ is (0.9−0.1)/719. It should be noted that, the projection coordinate system and the image projection area A depicted in FIG. 3 are merely schematic representations, and they are not drawn according to the actual scale.

In Step S220, the MEMS scanning device 140 moves the projection light beam PL to scan on the projection plane 10 and project to the projection points D sequentially. When the MEMS scanning device 140 moves the projection light beam PL to scan and project the projection light beam PL to the projection points D sequentially, in Step S230, the control unit 180 sequentially determines whether each of the projection points D is located in the image projection area A. When the projection point D is located in the image projection area A, in Step S240, the control unit 180 controls the projection light source 120 according to the corrected image information, so that the projection light beam PL provides the corresponding corrected image information to the projection point. In other words, by providing the corrected image information to the projection points in the image projection area A, the control unit 180 displays the projection image to be displayed in the image projection area A only.

Furthermore, when the projection location of the projection point D is not located in the image projection area A, in Step S250, the control unit 180 controls the projection light source 120 so the projection light beam correspondingly provides the monochromatic image information to the projection point D, such as a black image information. In other embodiments, when the projection location of the projection point D is not located in the image projection area A, then the control unit 180 may control the projection light source 120 to turn off so that the projection light beam PL is not generated to the projection points. Alternatively, the control unit 180 may also control the projection light beam PL to shut off (e.g., by shielding the projection light beam PL), so that the projection light beam PL cannot be projected to the projection points.

It should be noted that, for the method to determine whether the projection points D are located in the image projection area A, the aforementioned geometric distortion equation set F may be used to obtain the projection point coordinates corresponding to the projection points D. Moreover, whether the projection point D is located in the image projection area A may be determined according to whether the projection coordinates of the projection point D is located in the image projection area A.

Figure 4:
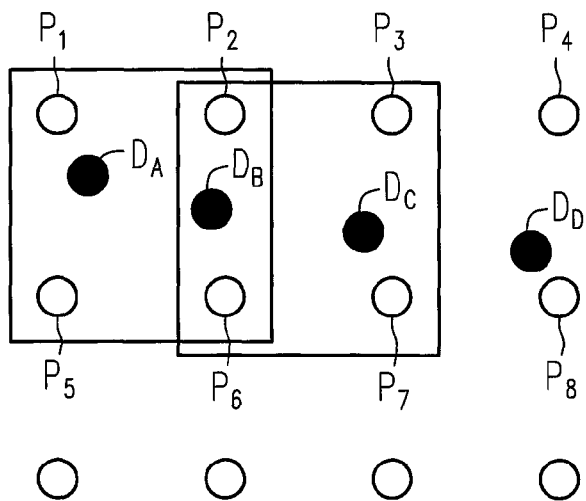
FIG. 4 is a schematic view of a method for providing a corrected image information according to an embodiment of the invention.

FIG. 4 is a schematic view of a method for providing a corrected image information according to an embodiment of the invention. With reference to FIGS. 1-4, when the control unit 180 determines the projection location of the projection point D is located in the image projection area A, the control unit 180 first searches the pixel coordinates around the projection point D and the corresponding pixels P according to the projection point coordinates of the projection point D. Thereafter, according to the pixel values corresponding to the pixels around the projection point D, the control unit 180 calculates a corrected pixel value that should be projected by the projection point D to serve as the corrected image information. The control unit 180 then controls the projection light source 120 according to the corrected pixel values, so as to project the projection light beam PL having the corrected pixel values to the projection point D. As described earlier, the projection point coordinates of the projection point D may be obtained by the geometric distortion equation set F.

In the present embodiment, as shown in FIG. 4, the pixels $P_1$-$P_8$ in the image projection area A are arranged according to the resolution of the image and the pixel coordinates defined by the range of the image projection area A, and each of the pixels has the corresponding pixel coordinates. Assume that the projection points $D_A$-$D_D$ are located in the image projection area A and near the pixels $P_1$-$P_8$ respectively. Since the projection points $D_A$-$D_D$ of the projection light beam PL cannot accurately correspond to a single pixel, an image correction method according to an embodiment of the invention further calculates the corrected pixel values that should be projected by the projection points according to the pixel values of the pixels P around the projection points $D_A$-$D_D$. For example, for a projection point $D_A$ in FIG. 4, the surrounding pixel coordinates and the corresponding pixels P are pixels $P_1$, $P_2$, $P_5$, and $P_6$, and therefore a corrected pixel value of the projection point $D_A$ may be obtained by an interpolation calculation according to the pixel values of the pixels $P_1$, $P_2$, $P_5$, and $P_6$. Similarly, for a projection point $D_C$, the surrounding pixel coordinates and the corresponding pixels P are pixels $P_2$, $P_3$, $P_6$, and $P_7$, and therefore a corrected pixel value of the projection point $D_C$ may be obtained by an interpolation calculation utilizing the pixel values of the pixels $P_2$, $P_3$, $P_6$, and $P_7$.

It should be noted that, only when the resolution of the image or the range of the image projection area changes, the image correction method need to be executed again to determine whether the projection location of the projection point is in the image projection area.

In view of the foregoing, the image projection apparatus and image correction method provided in embodiments of the invention may generate the image information to be displayed in a set image projection area. Moreover, since the distorted region of the scanning area is avoided, the image is not affected by the geometric distortion of the scanning area, and the projection image quality can be maintained. By displaying the image in the image projection area, the uneven projection speed of the projection light beam at the boundaries of the scanning area can be prevented from affecting the image quality.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A method for image correction on an image projection apparatus, the image apparatus scanning a projection light beam on a projection plane to form an image, the method for image correction comprising:
   sampling a plurality of projection points of the projection light beam on the projection plane to define a projection coordinate system, wherein the sampling step comprises:
      calculating a first maximum distance between the projection points along a first axis and calculating a second maximum distance between the projection points along a second axis; and
      defining the projection coordinate system according to the first maximum distance and the second maximum distance;

defining an image projection area on the projection coordinate system;
moving the projection light beam to scan on the projection plane and project to the projection points sequentially;
determining whether the projection points is located in the image projection area; and
when the projection point is located in the image projection area, providing a corrected image information to the projection point.

2. A method for image correction on an image projection apparatus, the image apparatus scanning a projection light beam on a projection plane to form an image, the method for image correction comprising:
sampling a plurality of projection points of the projection light beam on the projection plane to define a projection coordinate system;
defining an image projection area on the projection coordinate system;
moving the projection light beam to scan on the projection plane and project to the projection points sequentially;
determining whether each of the projection points is located in the image projection area;
when the projection point is located in the image projection area, providing a corrected image information to the projection point;
determining a coordinate range of the image projection area on the projection coordinate system; and
according to a resolution of the image and the projection coordinate system, defining a plurality of pixel coordinates in the image projection area.

3. The method for image correction according to claim 2, further comprising:
according to a projection point coordinate of the projection point in the projection coordinate system, correspondingly finding a portion of the pixel coordinates adjacent to the projection point, and finding a pixel value corresponding to each of the portion of the pixel coordinates;
calculating a corrected pixel value corresponding to the projection point according to the pixel values; and
setting the corrected pixel value as the corrected image information.

4. An image projection apparatus, comprising:
a scanning device moving a projection light beam to scan on a projection plane to form an image; and
a control unit sampling a plurality of projection points of the projection light beam on the projection plane to define a projection coordinate system; defining an image projection area on the projection coordinate system; moving the projection light beam to scan on the projection plane and project to the projection points sequentially; determining whether each of the projection points is located in the image projection area; when the projection point is located in the image projection area, providing a corrected image information to the projection point; determines a coordinate range of the image projection area on the projection coordinate system; and according to a resolution of the image and the coordinate range, defines a plurality of pixel coordinates in the image projection area.

5. The image projection apparatus according to claim 4, wherein the image projection apparatus further comprises a clock generator providing a clock signal, wherein the control unit samples the projection points of the projection light beam on the projection plane to define the projection coordinate system according to the clock signal.

6. The image projection apparatus according to claim 4, wherein the control unit further calculates a first maximum distance between the projection points along a first axis and calculates a second maximum distance between the projection points along a second axis; and defines the projection coordinate system according to the first maximum distance and the second maximum distance.

7. The image projection apparatus according to claim 4, the control unit further correspondingly finds a portion of the pixel coordinates adjacent to the projection point and a pixel value corresponding to each of the portion of the pixel coordinates according to a projection point coordinate of the projection point in the projection coordinate system; calculates a corrected pixel value corresponding to the projection point according to the pixel values; and sets the corrected pixel value as the corrected image information.

8. The image projection apparatus according to claim 4, wherein when the projection point is located outside of the image projection area, the control unit further provides a monochromatic image information to the projection point, or transmits a signal turning off the projection light beam.

* * * * *